Feb. 28, 1928.
A. C. E. LINDNER
1,660,971
WINDSHIELD WIPER
Filed April 19, 1926
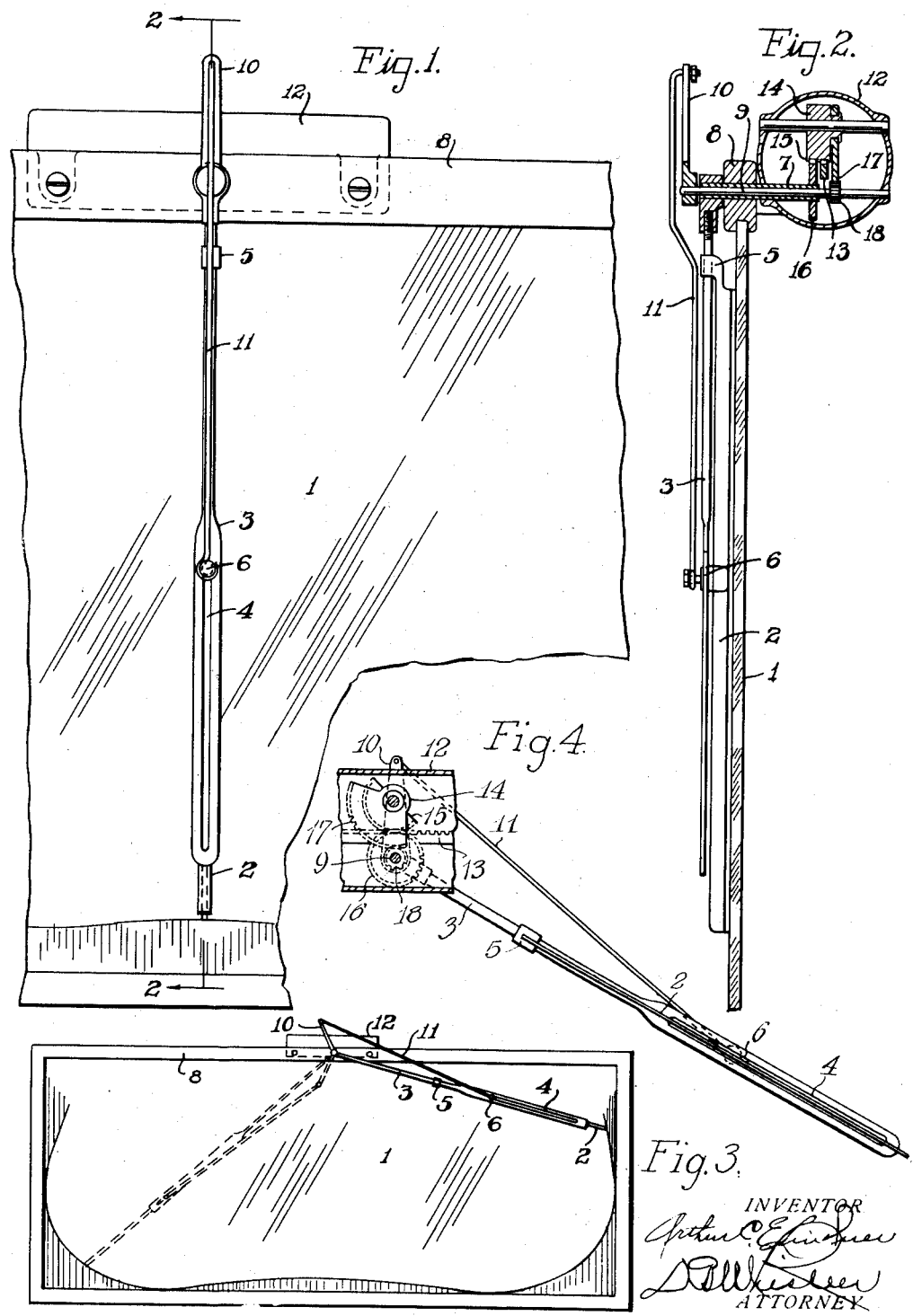

Patented Feb. 28, 1928.

1,660,971

UNITED STATES PATENT OFFICE.

ARTHUR C. E. LINDNER, OF MIDDLETOWN, OHIO.

WINDSHIELD WIPER.

Application filed April 19, 1926. Serial No. 102,901.

This invention relates to improvements in wind shield wipers.

The object attained in the invention is a wind shield wiper adapted to clean a relatively larger area of the glass than the ordinary type of cleaner which operates through an arc of a circle, the added area cleaned being extended laterally over the lower portion of the glass from the vertical center line of the arc of movement thus to afford a wider range of side view in both directions.

The improved wind shield wiper operates in a sense through a double arc movement generated from a single arc movement, the wiper blade having a coincident rotatable and a double reciprocable movement, the latter movement being effective to increase the range of the wiper laterally by axial projection of the blade on both sides of its vertical center line. The entire added surface that is cleaned is effective for increased range of vision in directions in which clear vision is essential to safety in driving when the elements of the weather act to obscure the view.

The invention as shown in the accompanying drawings to illustrate the principle of the double arc movement is in a preferred form but it will be understood that the showing is for the purpose of illustrating the principle of construction and operation of the device, it being recognized that various movements may be devised for effecting the double arc movement without departing from the principle involved in the means employed as here shown or in the result accomplished.

In the drawings:

Fig. 1 is a view of the improved wind shield wiper, viewed from outside the wind shield, serving to illustrate its range of action;

Fig. 2 is a sectional view taken on line 2—2 of Fig. 1;

Fig. 3 is a view of the wind shield wiper, reduced size;

Fig. 4 is a detail view of the wiper actuating gears.

As here shown the improved wind shield wiper comprises a wiper blade 2 which traverses the outer surface of the wind shield glass 1. The blade is supported slidably on a rotatable arm 3, the arm being slotted as indicated at 4 to effect the sliding connection of the blade therewith as indicated at 5—6.

The blade 2 is supported pivotally on a sleeve 7 supported in the wind shield frame 8. Arranged telescopically in sleeve 7 is a stem 9 which has an arm 10 connected to its outer end, the arm being connected pivotally to the wiper blade as indicated at the connection 6 by a link or pitman 11.

Operating movement is imparted to the wiper blade, as here shown, by means of a cylinder 12 which is connected to the vacuum system of the automobile motor in any suitable manner, to effect automatic operation of the piston. Operable with the piston axially of the cylinder is a rack 13, and co-acting with the rack is a compound segment 14 having gear teeth formed in its periphery at different pitch lines. On its lesser pitch line 15 the segment meshes with the rack 13 and with a pinion 16 secured to the inner end of sleeve 7 and on its greater pitch line 17 with a pinion 18 on stem 9. The gear ratios between segment 14 and pinions 16—18 is such that two rotations will be imparted to stem 9 and crank 10 and a half rotation to sleeve 7 and arm 3 upon each one way action of rack 13, thus the wiper blade will receive a complete axial reciprocation in each half section of the arc traversed by arm 3, the maximum retraction of the blade being on or near the radial center line and at the opposite edges of the arc and the maximum projection intermediate the center line and the opposite edges of the arc.

Fig. 1 serves to illustrate by the shadings the added area that is cleaned by the projectable wiper blade over that cleaned by the ordinary type of rotatable wind shield wiper. As the added area of cleaned glass serves to greatly increase the lateral range of unobscured vision in both directions the importance of the improvement will be recognized as an added feature of safety.

Having described my invention, I claim:

1. A wind shield wiper comprising a pivoted arm operable to swing through an arc over the glass, a wiper blade supported to move with the arm through said arc and slidable endwise beyond the free end of the arm, and means connected to said blade and timed with the motion of said arm for imparting a plurality of said endwise movements to said blade in each movement of the arm through said arc.

2. A wind shield wiper comprising a power operated rack, a member driven by said rack and having two sets of teeth formed thereon, a sleeve geared to one of said sets of teeth, an arm secured to the opposite end of said sleeve, a wiper blade slidable along said arm during its movement over the glass, a stem journaled within said sleeve and having a pinion geared to the other set of teeth, a crank secured to the opposite end of said stem and a link connecting the crank with said blade.

3. A wind shield wiper comprising an operable rack, a member driven by said rack and having two segmental gears of unequal radial lengths formed thereon, a sleeve geared to the smaller segmental gear, an arm secured to the opposite end of said sleeve, a wiper blade slidable along said arm during its movement over the glass, a stem journaled within said sleeve and having a pinion geared to the other segmental gear, a crank secured to the opposite end of said stem and a link connecting the crank with said blade.

4. A wind shield wiper comprising a wiper blade, actuating means for reciprocating the blade laterally through an arc over the glass, and means operable conjointly with said actuating means for reciprocating the blade axially during said lateral movement thereof.

In testimony whereof, I affix my signature.

ARTHUR C. E. LINDNER.